United States Patent [19]

Ambli

[11] 4,341,959
[45] Jul. 27, 1982

[54] WAVE ENERGY POWER STATION

[75] Inventor: Nils Ambli, Oslo, Norway

[73] Assignee: Kvaerner Brug A/S, Oslo, Norway

[21] Appl. No.: 138,401

[22] Filed: Apr. 8, 1980

[30] Foreign Application Priority Data

Apr. 19, 1979 [NO] Norway ................................ 791300

[51] Int. Cl.³ ............................................. F03B 13/12
[52] U.S. Cl. ........................................ 290/53; 290/42; 417/330
[58] Field of Search .................... 290/42, 53; 417/330; 415/126, DIG. 7

[56] References Cited

U.S. PATENT DOCUMENTS

| | | | |
|---|---|---|---|
| 3,200,255 | 8/1965 | Masuda | 290/53 X |
| 3,922,739 | 12/1975 | Babintsev | 290/53 X |
| 4,060,344 | 11/1977 | Ootsu | 290/42 X |
| 4,198,821 | 4/1980 | Moody et al. | 290/53 X |

FOREIGN PATENT DOCUMENTS

52-9741 1/1977 Japan ................................. 417/330

*Primary Examiner*—J. V. Truhe
*Assistant Examiner*—W. E. Duncanson, Jr.
*Attorney, Agent, or Firm*—Young & Thompson

[57] ABSTRACT

A wave energy power station comprises two water-filled chambers in communication at the bottom, wherein a first chamber is in communication with the sea at the upper end thereof and the second chamber is defined by one or more walls which project above the surface of the sea, such that pressure variations in the sea owing to the waves will set the water in an oscillating movement between the two chambers, and energy being tapped from the oscillating system, for example, by allowing the water in the chamber which is not in communication with the sea to overflow periodically into a reservoir, from which it is led back to the sea through a turbine, or by utilizing the water column in the second chamber for drawing in and compressing air which drives an air turbine. A water-filled tank is permanently installed on the sea bed or floating in the sea, and has a bottom and one or more walls, at least one wall or a portion of one wall being terminated at the upper edge thereof below the surface of the sea, the submerged upper edge and a partition wall which can be fixed or movable up and down in the water in the tank together defining the upper end of the chamber which communicates with the sea, the partition wall also, alone or together with one or more of the tank walls which project up above the surface of the water, defining the second chamber end which is not in communication with the sea, there being provided in the case of a fixed partition wall an adjacent tank wall section which is adapted for movement toward and away from the partition wall at the end of the second chamber for regulating the cross-sectional surface at that chamber end.

16 Claims, 13 Drawing Figures

WAVE ENERGY POWER STATION

The invention pertains to a wave energy power station comprising two water-filled chambers in communication at the bottom, wherein a first chamber is open to the sea at the upper end thereof, and the second chamber is defined by one or more walls which project above the surface of the sea, such that pressure variations in the sea owing to the waves will set the water in an oscillating movement between the two chambers, energy then being tapped from the oscillating system, for example, by allowing the water in the chamber which is not in communication with the sea to overflow periodically into a reservoir and return to the sea through a turbine, or by utilizing the water column in the latter chamber for drawing in and compressing air which drives an air turbine.

If the oscillatory system in such a wave energy power station is in resonance with the waves, the oscillations occuring in the chambers will be of significantly greater amplitude than the amplitude of the incoming waves. It would represent a great advantage in the satisfactory operation of such a wave energy power station, therefore, to be able to tune the oscillatory system such that it would at all times be in resonance with the most energetic components in the wave spectrum. It is known that the resonant frequency in such an oscillating system can be altered by changing the length of the oscillating mass of water, i.e., the distance the water has to travel from the seaward opening in the first chamber via the connecting opening between the two chambers to the free surface in the second chamber.

The resonant frequency can also be altered by effecting a change in the cross-sectional area of the oscillating free surface in the chamber which is not open to the sea. These two regulatory methods can also be combined.

It is thus a primary purpose of the present invention to provide a wave energy power station of the type specified introductorily in which one can change the length of the oscillating mass of water as needed, or optionally, in which one can change the cross-sectional area of the oscillating free surface in the chamber not open to the sea. Wave energy power stations are large and robust structures, and there is a clear need for simple means with which to regulate their operation, provided by strong and reliable structural components.

The aim of the invention, therefore, is to provide a wave energy power station in the form of a permanent or floating structure built of steel, concrete or some other suitable material, or a combination of different materials, said wave energy power station including one or more oscillatory systems, each such system comprising two water-filled chambers connected at the bottom; and in particular, to provide a construction in which the existing oscillating system or systems can be regulated in a simple manner, permitting one to change the length of the oscillating mass of water, to change the cross-sectional area of the oscillating free surface in the chamber which is not open to the sea, or to employ a combination of these two regulatory methods.

This is achieved according to the invention through the provision of a wave energy power station of the type specified introductorily, the structure being characterized by comprising a water-filled tank, permanently installed on the sea bed or floating in the sea, and having a bottom and one or more walls, at least one wall or a portion of one wall being terminated at the upper edge thereof beneath the surface of the sea, said submerged upper edge and a partition wall which can be fixed or movable up and down in the water in the tank together defining the upper end of the chamber which is open to the sea, said partition wall also, alone or together with one or more of the tank walls which project up above the surface of the sea, defining the second chamber which is not in communication with the sea, there being provided in the case of a fixed partition wall an adjacent tank wall section which is adapted for movement toward and away from the partition wall in the second chamber for regulating the cross-sectional area in this chamber end.

Such a wave energy power station is a simple and robust construction, in which the problem of being able to change the length of the oscillating mass of water, or optionally of being able to change the cross-sectional area of the oscillating free surface in the second chamber, i.e., the chamber which is not open to the sea, has been solved in a simple and, from the structural point of view, satisfactory manner.

When such a wave energy power station is to be installed, the submerged upper wall edge is directed toward the prevailing direction of the waves. An especially preferred embodiment of the wave energy power station is obtained if the submerged upper wall edge is made to extend around the circumference of the tank, and the partition wall comprises a tubular body with a vertical axis, movable up and down in the water in the tank. One is then not dependent on having to adjust the wave energy power station to the prevailing wave direction at any given time, because the wave energy power station will be able to be affected by waves which come in from all directions around the circle of the compass.

Preferably, the tubular body is adapted to slide in the vertical direction inside a stationary tubular body which constitutes a fixed part of the partition wall, the stationary tubular body extending from a distance beneath the submerged upper wall edge and projecting above the surface of the sea. In this way one protects the movable part of the partition wall against direct influence by the incoming waves.

The tubular partition wall is advantageously disposed around an overflow reservoir, the upper edge thereof being lower than the upper edge of the partition wall and forming an overflow edge for the water in the second chamber. This provides a compact embodiment of the wave energy power station, a concentric arrangement in which all of the respective components are protected by the tank and by the fixed section of the partition wall.

In a practical design, a water turbine is connected to the overflow reservoir. The water turbine is preferably connected to an electrical generator, and both components are disposed inside an internal pipe extending from the bottom of the overflow reservoir to project above the surface of the water, inlet openings being provided in the walls of said inner pipe for supplying water to the turbine.

In this way the water turbine and the electrical generator will be located centrally in the wave energy power station, well protected from outside influences.

The movable section of the partition wall is preferably slidingly supported against a tubular, downwardly-directed extension of the overflow reservoir. In this way one obtains additional control and guidance of the movable portion of the partition.

In a second embodiment, the fixed portion of the tubular partition wall can be surrounded by a peripheral overflow basin, whose upper wall edge is higher than the upper edge of the partition wall. Rather than the overflow basin's being located within the tubular partition wall, in other words, the overflow basin in this embodiment lies outside the partition, and forms a protection for the partition wall. Also in this embodiment, a water turbine is advantageously connected to the overflow basin. In this embodiment, too, the water turbine can be coupled to an electrical generator and the two components disposed inside a protective pipe in the overflow reservoir, inlet openings being provided in the walls of said pipe for supplying water to the turbine.

As mentioned previously, energy can also be tapped from the wave energy power station by utilizing the oscillating water column for drawing in and compressing air to drive an air turbine. In an embodiment for utilizing this kind of energy tapping, the tubular body, as mentioned above, is adapted to slide vertically inside a stationary pipe body which extends from a distance below the submerged upper wall edge to project beyond the surface of the sea, said stationary tubular body, which constitutes a fixed part of the partition wall, being closed at the top by a roof such that an air chamber is formed in the upper portion thereof.

As mentioned above, in addition to changing the length of the oscillating mass of water, one can also tune the system by changing the area of free surface in the second chamber. Such a solution has its basis in an embodiment in which the tubular partition wall is disposed around an overflow reservoir whose upper edge is lower than the upper edge of the partition wall and thus forms an overflow edge for the water in the second chamber, but where the outer wall of the overflow reservoir is made such that it includes upwardly and outwardly, and the movable, tubular section of the partition wall also has a correspondingly sloping inner wall. When the movable section of the partition wall is moved up and down, one will thus also at the same time change the free cross section at the surface in the second chamber.

The main idea of the invention can also be realized with a fixed partition. In this case, the second chamber, for example, can be formed with a wall flap pivotable about a horizontal axis toward and away from the partition wall, whereby the cross-sectional surface in this end of the chamber can be regulated, said wall flap forming one wall of an overflow reservoir, with the upper edge of the wall flap forming an overflow edge. This wall flap will lie well protected inside the power station. In such an embodiment, a water turbine can also advantageously be connected to the overflow reservoir, and the water turbine and an associated electrical generator can advantageously be disposed in a pipe projecting from the bottom of the overflow reservoir and up above the surface of the water, inlet openings being provided in said pipe for supplying water to the turbine.

As another example of a possible embodiment, the partition wall that is movable up and down in the water might be formed as a curved shield which is pivotally mounted about a horizontal axis, said axis coinciding with the axis of curvature, the chambers being defined otherwise by curved walls about said horizontal axis and walls arranged perpendicular thereto and the curved wall in the second chamber also constituting an overflow wall in an overflow reservoir. This type of curved shield structure is also a reliable and, from land-based power plants, well proved structure. Also in this case can one advantageously connect a water turbine and an associated electrical generator inside a pipe extending from the bottom of the overflow basin and projecting up above the water surface, with inlet openings being provided in the pipe for supplying water to the turbine.

The invention will be further elucidated with reference to the accompanying drawings, which in a strictly schematic manner illustrate several possible embodiments of the invention, embodiments which should not, however, be construed as exhausting the possibilities for practical structures which the invention provides.

FIG. 4b is a horizontal section through the embodiment of FIG. 4a,

FIG. 5b is a horizontal section through the embodiment in FIG. 5a,

FIG. 6b is a horizontal section through the embodiment in FIG. 6a,

In FIGS. 1, 2, 3 and 7, the cross sections are divided, to show on the left-hand side of the drawing the partition wall in the raised state and on the right-hand side of the drawing, the partition wall in the submerged state.

In all of the embodiment examples illustrated here, the power stations, being substantially concrete structures, are permanently installed on the sea bed, but the power station of the invention can also be made as a floating structure. One need not necessarily utilize concrete as the building material. Other suitable materials, such as steel, or a combination of various materials, could also be used.

Figure 1:
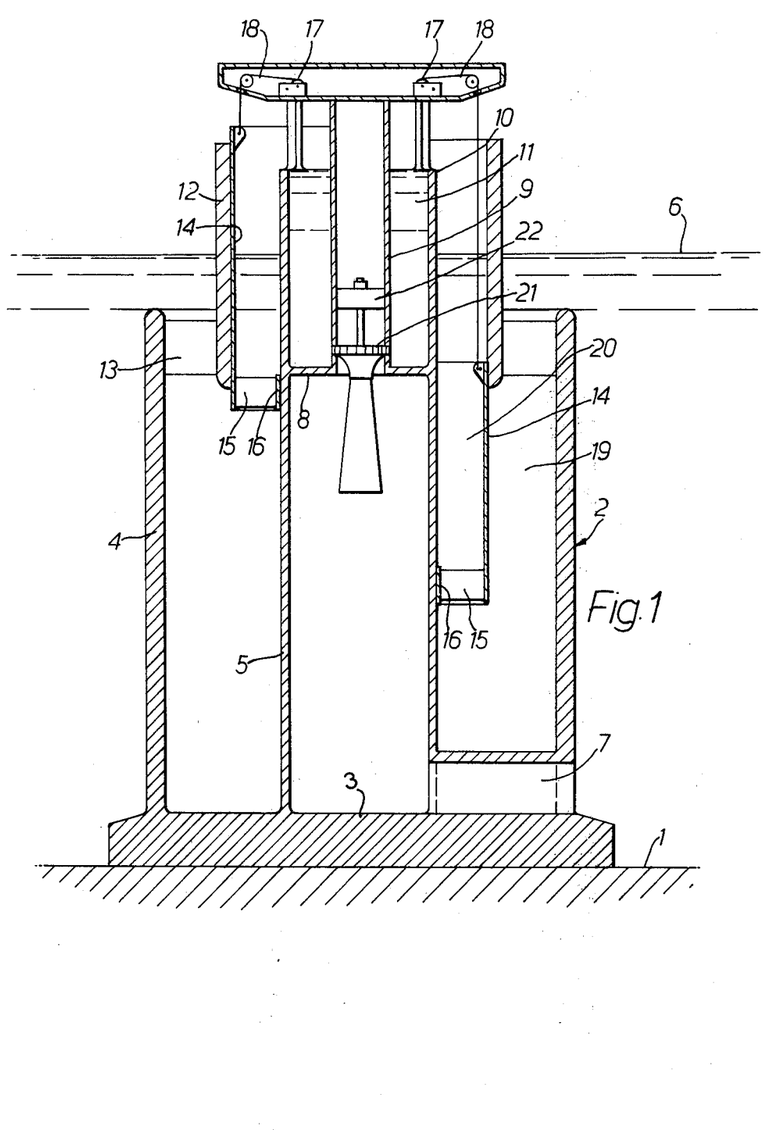
FIG. 1 shows a cross section through a first embodiment.
Figure 9:
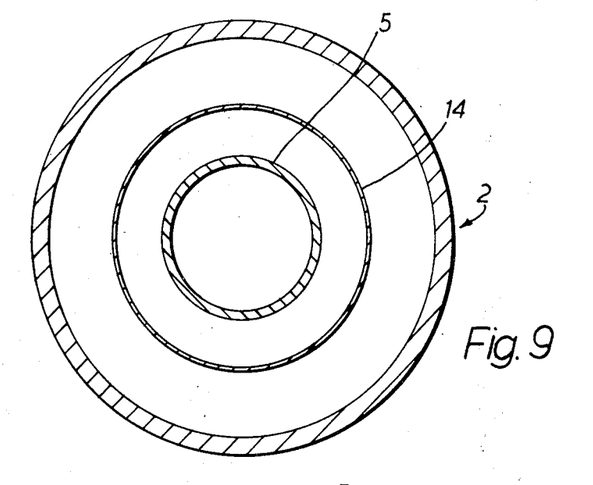
FIG. 9 is a horizontal section through the wave energy power station in FIG. 1.

In FIG. 1, the sea bed is designated 1, and a large tank 2 is placed on the sea floor. The tank, as shown in FIG. 9, is circular, but other tank configurations may be used.

The tank 2 is constructed with a bottom 3 and one or more walls 4. Inside the tank there are also one or more walls 5 which form an inner tubular tower structure which projects up above the surface of the sea 6. The tubular tower structure 5 is open to the sea at the bottom through one or more transverse channels 7. A distance up in the tubular tower structure 5, an intermediate bottom 8 is disposed, from which a pipe 9 projects upwardly. The inner pipe 9 extends upwardly beyond the upper edge 10 of the tower 5. The space above the intermediate bottom 8 forms an overflow reservoir 11, and the upper edge 10 forms an overflow edge.

A tubular body 12 is supported in the tank 2 by lateral support members 13, and this tubular body 12 constitutes an upper, fixed portion of the partition wall which is utilized for altering the oscillating stream of water in the power station. Slidably supported inside the tubular body 12 is a tube body 14, which constitutes the portion of the partition wall that is movable up and down in the water. By means of lateral support members 15, the tube body 14 is connected to a smaller tubular body 16 which is slidably supported against the tower 5.

Arranged on the tower 5 is a lifting arrangement including winches 17 by whose cables 18 the movable partition wall section 14 is suspended. By means of the winches 17, therefore, the wall section 14 can be raised and lowered between the two positions shown on the left- and right-hand sides, respectively, in FIG. 1.

The partition wall 12,14 divides the inside of the tank into two communicating chambers 19,20. One chamber 19 is open to the sea, while the second chamber 20 has a free surface which does not communicate with the sea. When waves affect the mass of water in the chambers 19,20, the water will be set in an oscillating motion between the two chambers. Oscillations will build up until at resonance a periodic overflow is obtained over the edge 10 to the overflow reservoir 11. By adjusting the partition wall section 14, one can shorten or lengthen the oscillating mass of water and in this way tune the system to the desired resonance.

Disposed inside the inner pipe 9 is a water turbine 21 with an associated electrical generator 22. Water is led from the overflow reservoir 11 directly into the water turbine through openings in the wall of pipe 9, and flows down through the hollow tower 5 and out into the sea through the opening 7.

Figure 2:
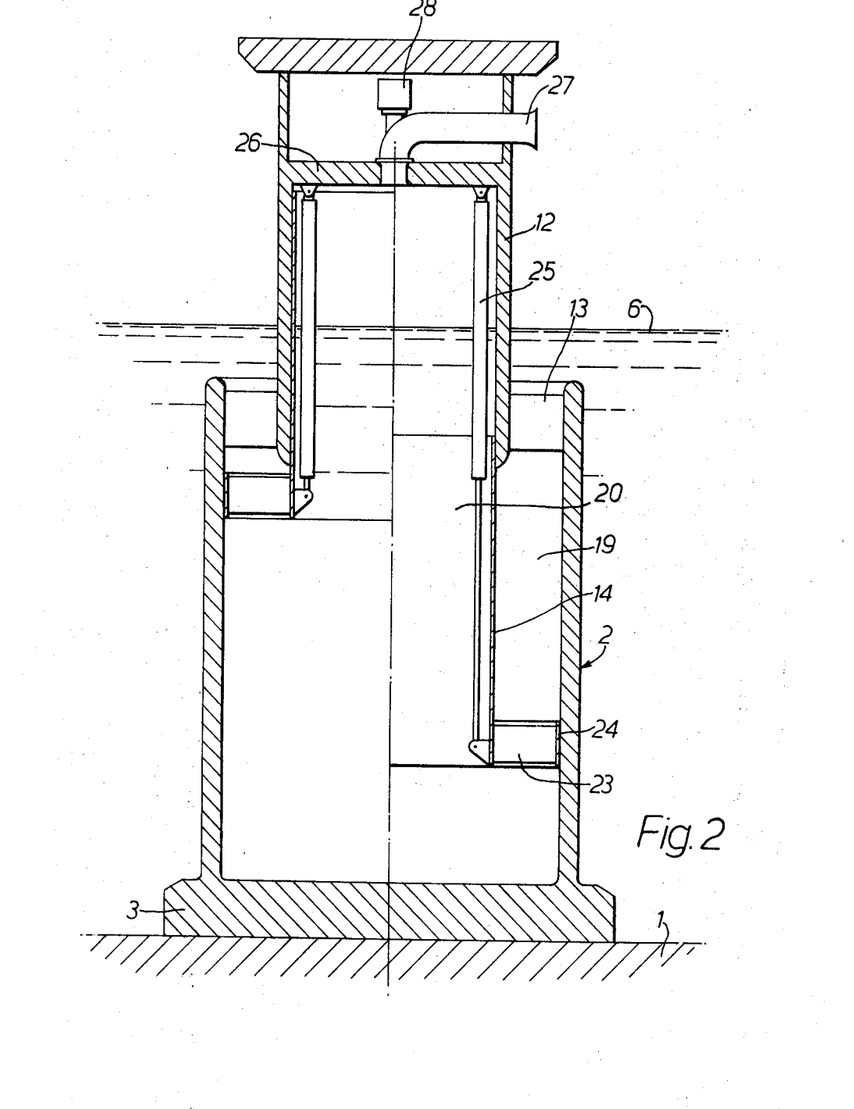
FIG. 2 is a cross section through a second embodiment.

FIG. 2 is a variation of the embodiment in FIG. 1, and the same reference numbers are utilized to designate otherwise similar structural components. One thus sees the submerged tank 2 and the upper stationary wall section 12, which is supported in the tank by means of the lateral supports 13. Further, one has a similar movable partition wall section 14, which is slidably supported against the inner wall of the fixed partition wall section 12. In addition, it is slidably supported against the inner wall of the tank by means of lateral supports 23 and a smaller pipe body 24.

The partition wall section 14 can in this case be raised and lowered by means of working cylinders 25. The first chamber 19 is also in this case formed by the annular space between the tank and the partition wall, but the second chamber 20 is larger, because one does not have the central tower 5 shown in FIG. 1.

Inside the encompassing fixed partition wall section 12 an air chamber is formed, a roof 26 being provided at the top. There is an opening in the roof through which air, as a result of the oscillations in the chamber 20, is alternately drawn in and forced through an air turbine 27 which drives an electrical generator 28.

Figure 3:
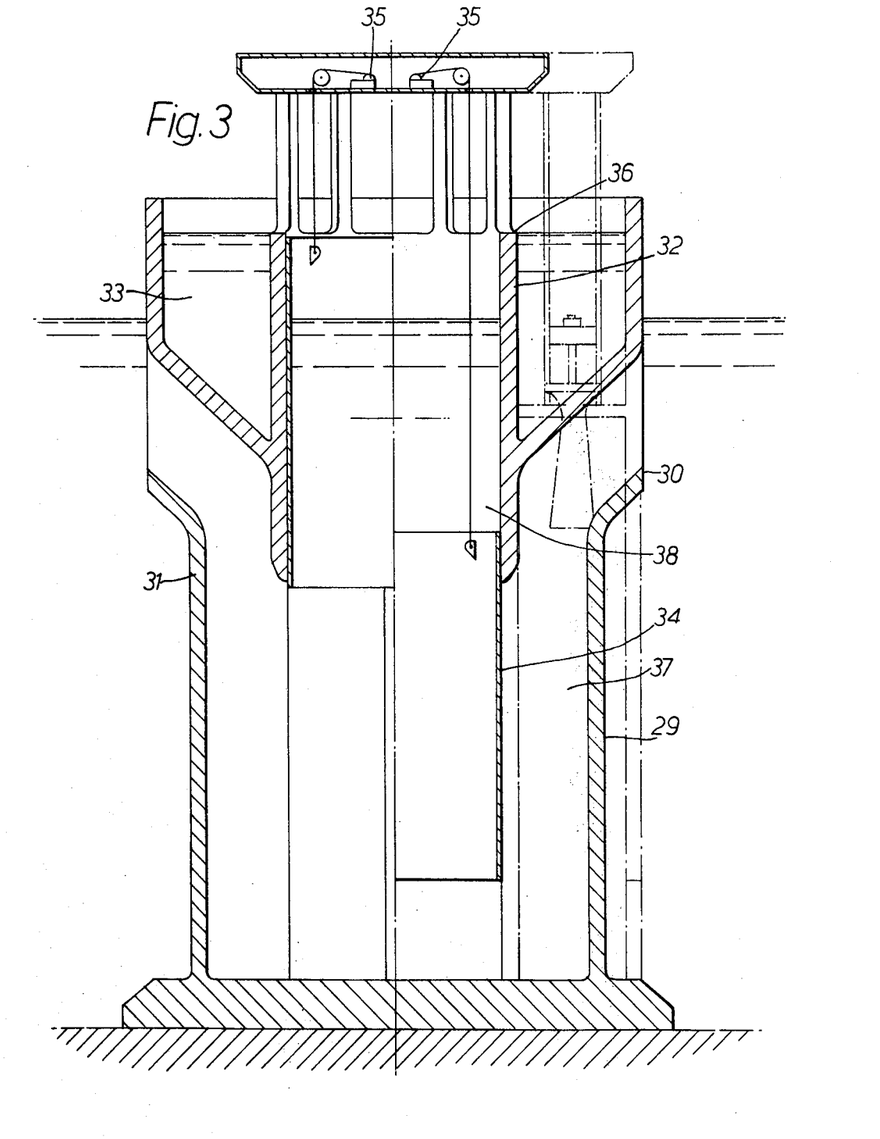
FIG. 3 is a cross section through a third embodiment.

The embodiment in FIG. 3 could also be considered a variation of the embodiment in FIG. 1, but its construction is somewhat different and will thus be explained further. The wave energy power station in FIG. 3 is constructed with an outer tank 29 which has a submerged upper edge 30 at the top. Inside the outer tank wall, support members 31 are provided to support an upper structure comprising an overflow reservoir 33 and the fixed portion 32 of a partition wall. The movable portion of the partition is designated 34, and this movable wall section, as in FIG. 1, can be raised and lowered by means of winches 35 arranged at the top of the wave energy power station.

In this embodiment, it is the upper edge 36 of the fixed partition wall 32 which forms the overflow edge for the overflow reservoir 33. The partition wall divides the inside of the tank into a first chamber 37, open to the sea, and an inner, second chamber 38.

A water turbine and an electrical generator coupled thereto are indicated by stippled lines, disposed in a tower/pipe structure which corresponds to that shown in FIG. 1, but placed in this case out toward the side of the power station.

Common to the embodiments in FIGS. 1, 2 and 3 is that the waves have an effect on the power station from all directions, and these embodiments are therefore considered to be especially advantageous. Often, however, the direction of the waves at the chosen location for the power station will be so constant over an extended period of time that one could with advantage also utilize a wave energy power station which is adapted to receive waves coming from a specific main direction. An example of a power station of this type is shown in FIG. 4.

Figure 4A:
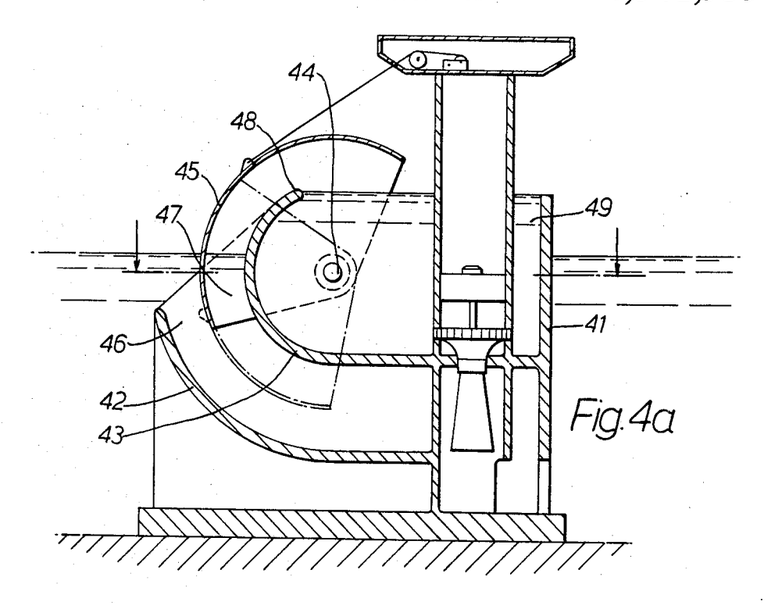
FIG. 4a is a cross section through a fourth embodiment.
Figure 4B:
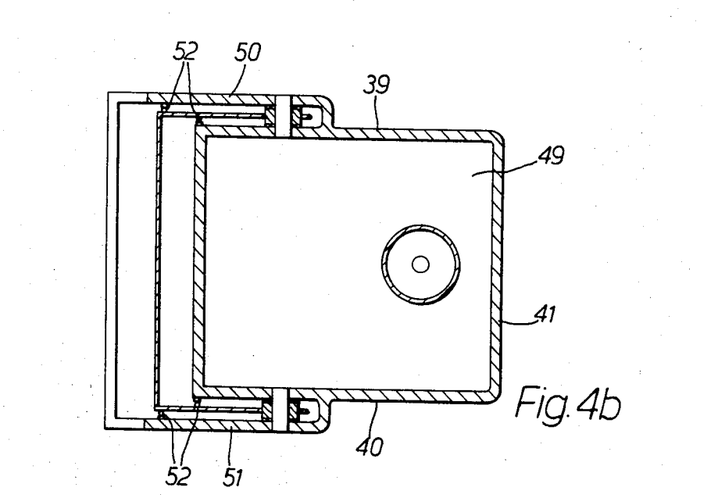

The power station in FIG. 4 is a concrete structure having vertical walls 39,40,41 and curved walls 42,43, the curved walls curving about an axis 44 which also constitutes the axis of pivot for a curved shield 45. The curved shield can be pivoted about the axis 44 to swing down between the curved walls 42,43, thus forming two water-filled chambers 46,47, respectively. By pivoting the shield 45 to a greater or lesser degree down between the curved walls 42,43, one can change the length of the oscillating water column in the chambers 46,47 and obtain resonance such that the water will periodically flow over the upper edge 48 of the uppermost curved wall 43. The curved wall 43, together with the walls 39 and 40,41, define an overflow reservoir 49. A tower/pipe structure is arranged in the overflow reservoir with a built-in water turbine and electrical generator of the same general type as shown and described above in connection with FIG. 1.

Outer walls 50,51 are provided, connected to the walls 39,40, and the curved shield 45 is sealed by means of suitable gaskets 52.

Figure 5A:
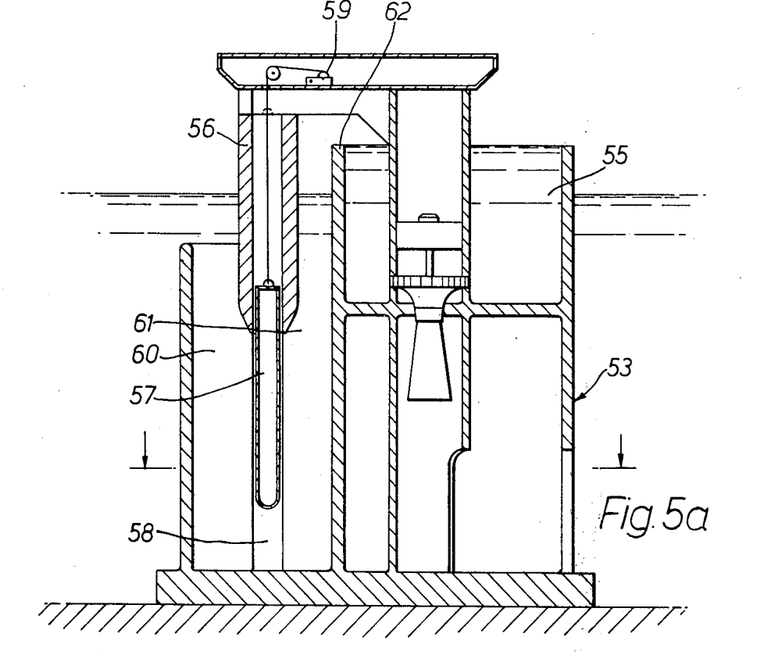
FIG. 5a shows a cross section through a fifth embodiment.
Figure 5B:
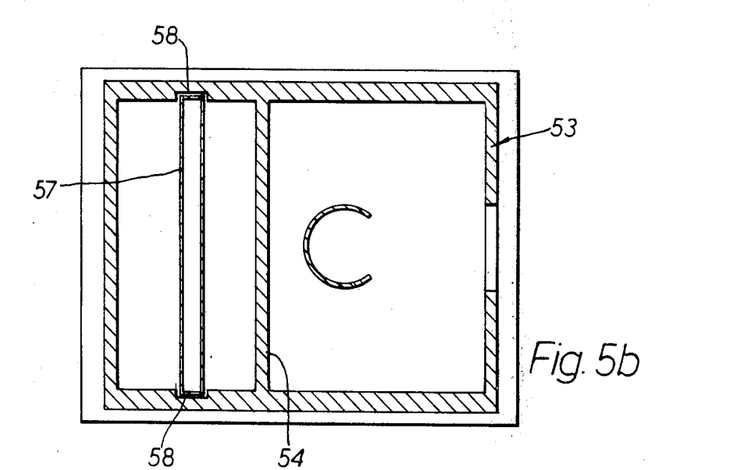

FIG. 5 shows a simple embodiment in which the tank 53, seen in plan view, is of rectangular configuration. An internal wall 54 subdivides the tank into two rooms, one of which houses the communicating chambers while the other houses an overflow reservoir 55 and a tower structure with a water turbine and electrical generator of the same general type as shown and described in connection with FIG. 1.

In an upper, fixed partition wall section 56, a movable partition wall section 57 is slidably supported. The partition wall section 57 is also guided in grooves 58 in the inner wall of the tank. By means of a winch 59, the partition wall section 57 can be raised and lowered, thereby changing the length of the mass of water in the communicating water systems formed by the two chambers 60,61. At resonance, the water in the chamber 61 will flow over the upper edge 62 of the overflow reservoir 55.

Figure 6A:
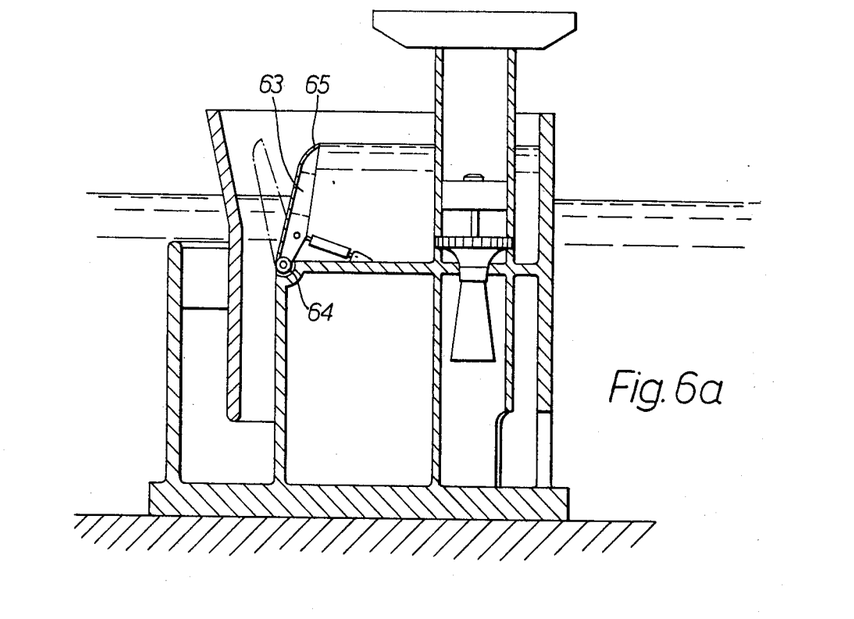
FIG. 6a is a cross section through a sixth embodiment.
Figure 6B:
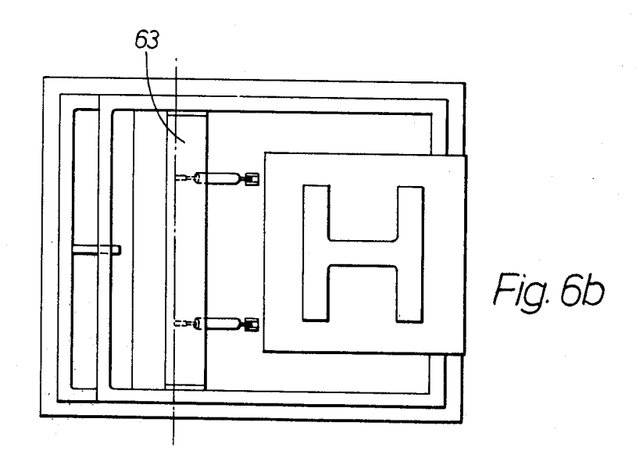

The drawings discussed up to now show wave energy power stations in which the tuning of the oscillatory system occurs by changing the length of the water mass oscillating between the two chambers. FIG. 6 shows a wave energy power station in which the tuning occurs by varying the cross-sectional area of the free surface in the second chamber. The configuration of the plant in FIG. 6 is essentially the same as in FIG. 5 and should not require further explanation, except to note that a wall in the overflow reservoir is formed as a flap 63 pivotable about a hinge connection 64. At resonance, water will periodically flow over the edge 65 on the door or flap 63 into the overflow reservoir.

Figure 7:
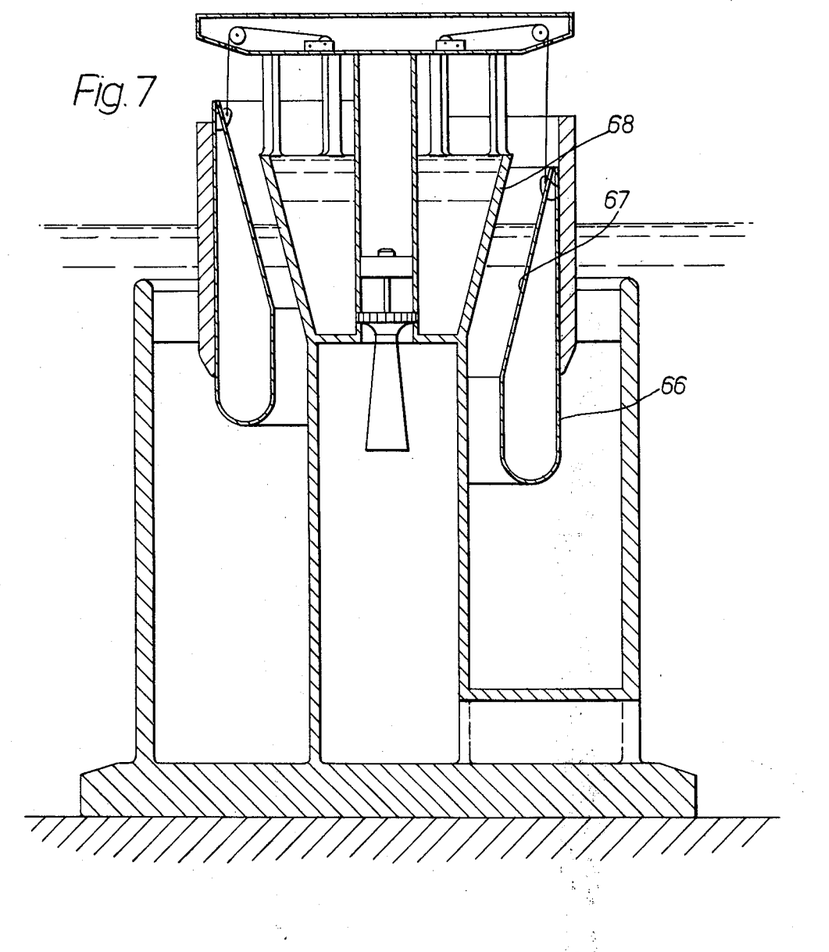
FIG. 7 is a cross section through a seventh embodiment, in which one can regulate both the length of the oscillating mass of water and the free cross-sectional area in the chamber which does not communicate with the sea.

The wave energy power station in FIG. 7 can also be considered a variation on the embodiment in FIG. 1, and the structural construction of the power station in FIG. 7 ought to be obvious from the drawing and the general description given of the embodiment in FIG. 1. However, in FIG. 7 the movable portion 66 of the partition wall is formed with an inner surface 67 which inclines outwardly and upwardly. The outer wall of the overflow reservoir slopes in the same manner, this sloping surface being designated 68. When the partition wall section 66 is raised and lowered, therefore, both the length of the water column and the cross-sectional area at the top of the chamber not in communication with the sea will be varied.

Figure 8:
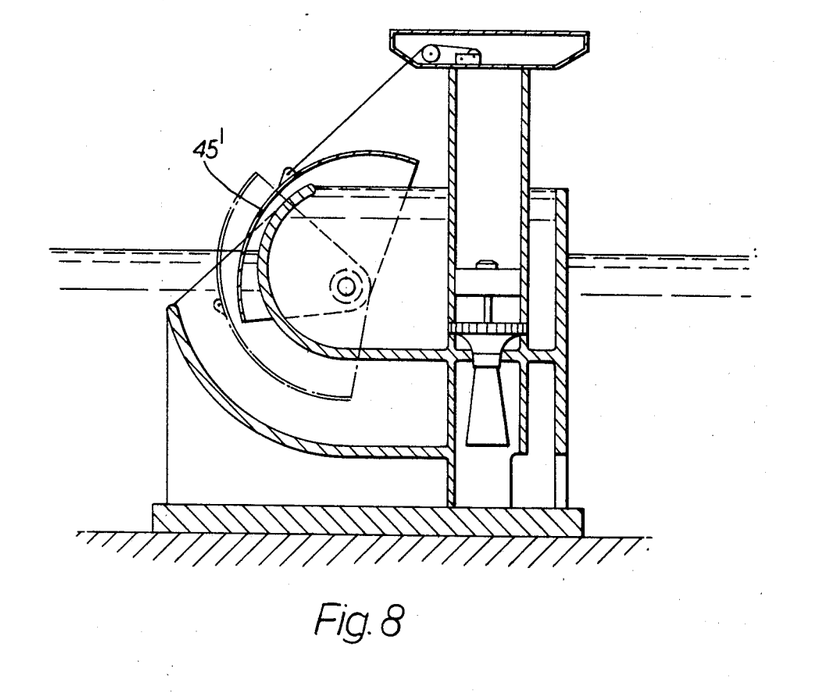
FIG. 8 shows, in cross section, an embodiment which is a modification of the embodiment in FIG. 4, and which enables one to change both the length of the mass of oscillating water and the free cross-sectional area in the chamber which does not communicate with the sea.

The embodiment in FIG. 8 is a variation of the embodiment shown in FIG. 4, and the reader should refer to the description of FIG. 4 above. The difference between the two embodiments in FIGS. 4 and 8 is that the curved shield, designated in FIG. 8 as 45', is eccentrically supported, as seen clearly in FIG. 8. As a result, one obtains a variation both in the length of the oscillating mass of water and in the cross-sectional area at the top of the second chamber when the shield is turned about its axis of pivot.

The power stations in FIGS. 1, 2 and 3 and 7 can be made with one or more oscillating systems around the circumference, each having an independent displaceable body for tuning.

Figure 10:
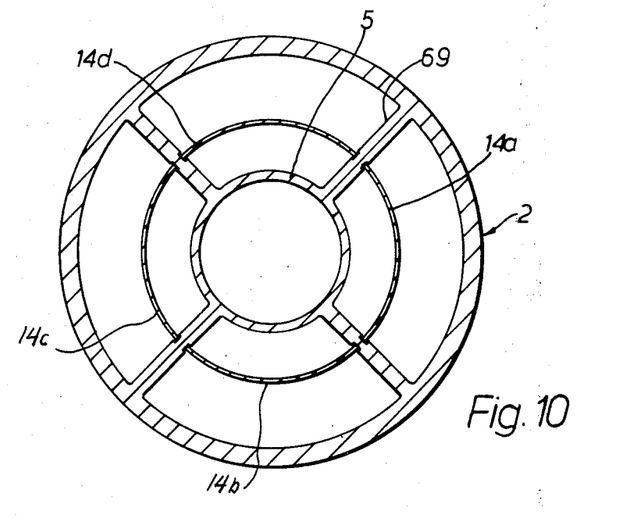
FIG. 10 shows a similar horizontal section through a wave energy power station of the general type shown in FIG. 1, but with the partition wall subdivided and adapted to divide the wave energy power station into a plurality of oscillating systems.

In this connection, FIG. 9 shows a horizontal section through a symmetrical-rotation embodiment of FIG. 1, with one oscillating system. FIG. 10 shows how the embodiment in FIG. 1 can be modified such that one obtains four oscillating systems. In FIG. 10, the movable portion of the partition wall is subdivided into four sections 14a, b, c and d, adapted to the four chambers formed by radial partition walls 69. In FIG. 10, the oscillating systems are shown as being of the same width in the circumferential direction, but the oscillating systems could naturally also have different widths in the circumferential direction.

The wave energy power stations in FIGS. 4, 5, 6 and 8 can stand alone, or can be set together in a row. The overflow reservoirs can be interconnected and can be associated with one or a plurality of common turbines.

Having described my invention, I claim:

1. In a wave energy power station comprising two water-filled chambers in communication with each other at the bottom, a first one of said chambers being in communication with the sea at the upper end thereof and the second chamber being defined by at least one wall which projects above the surface of the sea, the water in said first and second chambers comprising a continuous body of water, the water in said second chamber having an exposed upper surface out of communication with the sea, said upper surface rising above the level of the surface of the sea with an oscillating movement in opposite directions under the influence of wave action, and means to utilize the potential energy of the water in the second chamber which is higher than the surface of the sea; the improvement comprising means to tune the resonant frequency of said body of water in said chambers to that of the waves, said tuning means comprising means for selectively changing at least one of the length of said body of water and the area of said exposed upper surface.

2. A power station as claimed in claim 1, including a reservoir into which water overflows over said at least one wall, and a turbine communicating between said reservoir and the sea through which water flows from said reservoir back to the sea thereby to operate the turbine.

3. A power station as claimed in claim 1, including means defining an enclosed air space above said exposed upper surface, said utilizing means comprising means communicating with said air space to utilize the kinetic energy of air displaced by vertical movement of said exposed upper surface.

4. A power station as claimed in claim 1, said tuning means comprising means to change the length of said body of water.

5. A power station as claimed in claim 4, said means to change the length of said body of water comprising a partition whose lower edge defines the boundary between said chambers, and means selectively to move said partition with a component of vertical motion.

6. A power station as claimed in claim 5, and means mounting said partition for vertical sliding movement.

7. A power station as claimed in claim 5, and means mounting said partition for vertical swinging movement about a horizontal axis.

8. A power station as claimed in claim 1, said tuning means comprising means to alter the area of said exposed upper surface.

9. A power station as claimed in claim 8, said tuning means comprising partition means having an inclined surface mounted for vertical sliding movement.

10. A power station as claimed in claim 8, said tuning means comprising partition means mounted for vertical swinging movement about a horizontal axis.

11. A power station as claimed in claim 1, said tuning means changing both the length of said column and the area of said exposed surface.

12. A power station as claimed in claim 11, said tuning means comprising vertically slidable means having an inclined surface, said inclined surface upon vertical sliding movement changing the area of said exposed upper surface and the lower edge of said vertically slidable means upon vertical movement changing the length of said body of water.

13. A power station as claimed in claim 11, said tuning means comprising partition means mounted for vertical swinging movement about a horizontal axis, said partition means having a lateral surface which, upon vertical swinging movement, has a component of horizontal movement relative to said exposed upper surface thereby to alter the area of said exposed upper surface and having a lower edge which upon vertical swinging movement moves with a component of vertical movement to alter the length of said body of water.

14. A power station as claimed in claim 1, in which said chambers are annular and concentric and vertical.

15. A power station as claimed in claim 1, in which there are a plurality of said first chambers and a plurality of said second chambers disposed in side-by-side relationship.

16. A power station as claimed in claim 15, in which said first chambers are disposed in an annular series and said second chambers are disposed in an annular series within said annular series of said first chambers.

* * * * *